United States Patent
Takanashi et al.

(10) Patent No.: US 7,269,213 B2
(45) Date of Patent: Sep. 11, 2007

(54) WAVEFORM EQUALIZER HAVING A TAP COEFFICIENT MONITORING UNIT

(75) Inventors: Kazushi Takanashi, Shizuoka (JP); Takeshi Akiyama, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1314 days.

(21) Appl. No.: 09/730,188

(22) Filed: Dec. 5, 2000

(65) Prior Publication Data

US 2001/0004384 A1    Jun. 21, 2001

(30) Foreign Application Priority Data

Dec. 6, 1999    (JP)    ............... P. 11-346854

(51) Int. Cl.
*H03H 7/30*    (2006.01)
(52) U.S. Cl. ............ 375/229; 375/232; 375/350; 375/130; 360/46; 360/65; 360/66
(58) Field of Classification Search ........... 375/232, 375/229, 235, 350, 290, 130; 348/614; 360/46, 360/65, 66
See application file for complete search history.

(56) References Cited

U.S. PATENT DOCUMENTS

| | | | | |
|---|---|---|---|---|
| 4,434,438 A | * | 2/1984 | Rzeszewski | 348/614 |
| 5,228,058 A | * | 7/1993 | Ushirokawa et al. | 375/232 |
| 5,293,401 A | | 3/1994 | Serfaty | |
| 5,517,213 A | * | 5/1996 | Bhatt et al. | 375/232 |
| 5,999,349 A | * | 12/1999 | Choi | 360/46 |
| 6,421,378 B1 | * | 7/2002 | Fukuoka et al. | 375/229 |
| 6,434,193 B1 | * | 8/2002 | Fukuoka | 375/235 |
| 6,608,862 B1 | * | 8/2003 | Zangi et al. | 375/232 |
| 2003/0161423 A1 | * | 8/2003 | Satomi et al. | |
| 2003/0169665 A1 | * | 9/2003 | Miyashita et al. | |

FOREIGN PATENT DOCUMENTS

| | | |
|---|---|---|
| EP | 0 541 225 A2 | 5/1993 |
| EP | 0 609 828 A2 | 8/1994 |
| EP | 0 615 347 A1 | 9/1994 |
| EP | 0 831 478 A1 | 3/1998 |
| JP | 5-75498 | 3/1993 |

OTHER PUBLICATIONS

Meng-lin Yu and Patrik Larsson, "A Technique for Improving the Convergence Probability of Blind Equalization", Sep. 1997, IEEE, pp. 326-330.

* cited by examiner

*Primary Examiner*—Chieh M. Fan
*Assistant Examiner*—Eva Zheng
(74) *Attorney, Agent, or Firm*—Pearne & Gordon LLP

(57) ABSTRACT

A waveform equalizer having a delay element of a feed-forward filter into which a reception signal is inputted is connected via a tap arrangement control switch to a weighting device The output of the weight device is inputted into an adder. The output of the adder is entered into a discriminator to become an equalization output. The equalization output is entered into a delay element of a feed-back filter. The delay element is connected via the tap arrangement control switch to the weighting device. The tap arrangement control switch ON/OFF-controls the tap arrangement. The tap coefficient monitoring unit monitors the tap coefficients of the weighting device. When the equalization operation cannot be carried out, it is restarted from the beginning of the reception signal. An impulse response predictor predicts an impulse response of a transfer path based upon the reception signal and the equalization output.

6 Claims, 10 Drawing Sheets

| | | TAP OF FF FILTER | | | | | TAP OF FB FILTER | | | |
|---|---|---|---|---|---|---|---|---|---|---|
| | SWITCH 108 | F4 | F3 | F2 | F1 | F0 | B1 | B2 | B3 | B4 |
| (A) | ON/OFF STATE BEFORE CHANGING TAPS | OFF | OFF | OFF | ON | ON | ON | ON | ON | OFF |
| (B) | ON/OFF STATE AFTER CHANGING TAPS | OFF | OFF | OFF | OFF | ON | ON | ON | ON | ON |

| | TAP OF FF FILTER | | | | | TAP OF FB FILTER | | | |
|---|---|---|---|---|---|---|---|---|---|
| SWITCH 1508 | F4 | F3 | F2 | F1 | F0 | B1 | B2 | B3 | B4 |
| ON/OFF | OFF | OFF | OFF | ON | ON | ON | ON | ON | OFF |

US 7,269,213 B2

WAVEFORM EQUALIZER HAVING A TAP COEFFICIENT MONITORING UNIT

BACKGROUND OF THE INVENTION

The present invention is related to a waveform equalizer having better equalization performance even in such a case that a transfer path is strongly varied, and is also related to a mobile station wireless apparatus and a mobile base station wireless apparatus, such as a mobile telephone, a car telephone (automobile telephone), and a private digital wireless communication telephone, which use this waveform equalizer so as to remove an adverse influence caused by frequency selective fading. Further, the present invention is related to a mobile communication system arranged by these mobile station wireless apparatus and base station wireless apparatus.

FIG. 15 is a block diagram for representing an arrangement of a conventional waveform equalizer. This conventional waveform equalizer is arranged by a feed-forward filter (FF filter) 9, a feed-back filter (FB filter) 10, an adder 4, and a discriminator 5. A reception signal S1 is entered into a plurality of delay elements 2. The plural delay elements 2 are cascade-connected inside the FF filter 9. A plurality (F0 to F4) of tap arrangement control switches 8 for controlling tap arrangements of the delay elements 2 are connected to the respective delay elements 2, and are connected via a weighting device 3 to the adder 4. The output of the adder 4 is inputted to the discriminator 5, and the output of the discriminator 5 constitutes an equalization output S2. On the other hand, the equalization output S2 is entered into a plurality of delay elements 7 which are cascade-connected within the FF filter 10. A plurality (B1 to B4) of tap arrangement control switches 8 for controlling tap arrangements of the delay elements 7 are connected to the respective delay elements 7, and are connected via the weighting device 3 to the adder 4.

In this case, the FF filter 9 may contribute the equalization of the components of the preceding waves rather than the equalization of the components of main waves (namely, waves having highest levels). The preceding waves are reached to this FF filter 9 earlier than the main waves. On the other hand, the FB filter 10 may contribute the equalization of the components of the delayed waves rather than the equalization of the components of main waves (namely, waves having highest levels). The delayed waves are reached to this FB filter 10 later than the main waves.

FIG. 2 represents an example of a burst structure of a reception signal entered into the waveform equalizer. In this drawing, symbols "Ta", "Tb", and "Tc" show reception time instants, respectively; section Ta to Tb indicates the known reference signal; and a section Tb to Tc represents random data. FIG. 6 represents an example of reception power of incoming waves (arrival waves) corresponding to the reception burst of FIG. 2, namely shows such a condition that there is substantially no variation in a transfer path. FIG. 16 represents a predicted impulse response of a transfer path, which is predicted by employing the reference signal of the section Ta to Tb of FIG. 6. FIG. 17 is a diagram for representing ON/OFF states of the tap arrangement control switch 8.

In general, the following necessary conditions are known in this field. To equalize preceding waves within an n-symbol time period with respect to main waves, the FF filter 9 necessarily requires (n+1) pieces of taps. Also, to equalize delayed waves within an n-symbol time period, the FB filter 10 necessarily requires (n) pieces of taps.

Now, considering such a case that the equalization is carried out with respect to the incoming waves as shown in FIG. 6, in the predicted impulse response of FIG. 16, since the components of the preceding waves which are temporally advanced to the main waves are present within 1 symbol time period, the taps of the FF filter may be sufficiently selected to be (1+1=) 2 taps. Also, since all of the components of the delay waves which are temporally delayed from the main waves are present within 3-symbol time period, it may be seen that the taps of the FB filter may be sufficiently selected to be 3 taps.

As previously described, the respective taps (F0 to F4 and B1 to B4) of the tap arrangement control switch 8 are set to ON/OFF states as indicated in FIG. 17, and thus, the tap arrangement of the waveform equalizer can be optimally formed with respect to the predicted impulse response of FIG. 16.

After the respective taps are set by the tap arrangement control switch 8, the reception signal S1 is sequentially stored in the respective delay elements 2 provided on the side of the FF filter 9, and then, the weighting operation by the tap coefficient of the weighting device 3 is carried out only for such a tap output that the respective taps of the tap arrangement control switch 8 are turned ON. As a result, the weighted outputs are entered to the adder 4. Furthermore, the output of the adder 4 is entered to the discriminator 5, and then, the symbol of this input signal is judged, so that the equalization output S2 is obtained. At the same time, this equalization output S2 is sequentially stored into the respective delay elements 7 provided on the side of the FB filter 10, and then, the weighting operation by the tap coefficient of the weighting device 3 is carried out only for such a tap output that the respective taps of the tap arrangement control switch 8 are turned ON. As a result, the weighted outputs are entered to the adder 4.

While the above-described equalization operation is carried out, the respective tap coefficients of the weighting device 3 are sequentially updated in such a manner that the errors produced between the signal input to the discriminator 5 and the symbol output equal to the judgment results of the discriminator 5 can be minimized.

The conventional waveform equalizer is operated in the above-described manner. That is, while the tap arrangement is controlled by the tap arrangement control switch 8, the signal equalization operation is carried out by the optimally-set tap arrangement having the necessary number of taps. This signal equalization operation may constitute the best equalizing method in such a case that the variation of the transfer path may be substantially neglected as shown in FIG. 6.

However, the optimum tap arrangement is determined based upon the predicted impulse response of the transfer path, which is predicted by utilizing the reference signal and the like of FIG. 2. As a consequence, in such a case that the variation of the transfer path is strongly emphasized due to the fading phenomenon, for instance, there are many possibilities that such an optimum tap arrangement is no longer maintained as to the rear half data portion of the data shown in FIG. 2. In this case, the equalization performance of the equalizer is considerably deteriorated.

Also, in the case that the transfer path is strongly varied, since such a time period that a ratio of carrier wave power to noise (will be referred to as a "CNR" hereinafter) becomes small is shortened, possibility is increased under which a single reception burst contains portions where CNR becomes small. As a consequence, such possibility that the CNR of the reference signal portion of FIG. 2 becomes small would be increased, and also, when the CNR becomes small, the errors contained in the predicted value of the impulse response of the transfer path are increased. This fact may impede the determination of the optimum tap arrangement, resulting in a problem.

Also, in such a case that the levels of the impulse response of the transfer path compete with each other among the incoming waves, and therefore, any one of these incoming waves can be hardly selected as the main wave, if such an incoming wave which does not constituted an optimum wave is selected as the main wave, then the equalization is carried out by employing such a not-optimally-selected tap arrangement. As a result, there is another problem that the equalization performance would be deteriorated.

SUMMARY OF THE INVENTION

The present invention has been made to solve the above-described problems, and therefore, has an object to provide a waveform equalizer capable of achieving better equalization performance even when a variation of a transfer path within a reception burst is strongly produced, and also to provide a mobile station wireless apparatus, a base station wireless apparatus, and a mobile communication system, which employ this waveform equalizer.

To achieve the above-described object, first aspect of the present invention is featured by that in a waveform equalizer equipped with an equalizing filter unit constructed by a delay circuit having a tap; a discriminator for decoding an output signal of the equalizing filter unit; and tap arrangement control means for controlling a tap arrangement of the equalizing filter unit; the waveform equalizer is comprised of: a tap coefficient monitoring unit for monitoring a tap coefficient of the equalizing filter unit, and for changing the tap arrangement of the equalizing filter unit so as to restart a starting step of equalizing steps for equalizing a reception signal, depending upon a change state of the tap coefficient used while the reception signal is equalized.

With employment of the above-described arrangement, since the equalization of the reception signal is restarted from the starting step in such a case that the equalization cannot be carried out under the initially set tap arrangement, the equalization performance can be improved by changing such a condition that the initially set tap arrangement becomes improper.

Also, second aspect of the present invention is featured by that in a waveform equalizer equipped with an equalizing filter unit constructed by a delay circuit having a tap; a discriminator for decoding an output signal of the equalizing filter unit; and tap arrangement control means for controlling a tap arrangement of the equalizing filter unit; the waveform equalizer is comprised of: a tap coefficient monitoring unit for monitoring a tap coefficient of the equalizing filter unit, and for changing the tap arrangement of the equalizing filter unit so as to restart reception signal equalizing steps from a preselected step prior to the present step thereof while the reception signal is equalized, depending upon a change state of the tap coefficient during the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. As a consequence, the equalization performance realized when the variation of the transfer path is strongly produced can be improved. Also, the calculation amount can be reduced, the power consumption can be reduced, and further, the apparatus can be made compact.

Also, third aspect of the present invention is featured by that in a waveform equalizer equipped with an equalizing filter unit constructed by a delay circuit having a tap; a discriminator for decoding an output signal of the equalizing filter unit; and tap arrangement control means for controlling a tap arrangement of the equalizing filter unit; the waveform equalizer is comprised of: a tap coefficient monitoring unit for monitoring a tap coefficient of the equalizing filter unit, and for changing the tap arrangement of the equalizing filter unit so as to restart reception signal equalizing steps from a preselected step prior to the present step thereof while the reception signal is equalized, depending upon a change state of the tap coefficient during the equalization of the reception signal; and further so as to repeatedly perform the operation, depending upon a change condition of the tap coefficient while restarting the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. Also, both the detection as to whether or not the equalization can be carried out and the restarting operation of the equalization are repeatedly performed. As a consequence, the equalization performance realized when the variation of the transfer path is strongly produced can be improved.

Also, fourth aspect of the present invention is featured by that the tap coefficient monitoring unit monitors only a specific tap, and when a sharp change in a tap coefficient of the specific tap is detected, the tap coefficient monitoring unit instructs that the tap arrangement of the equalizing filter unit is changed so as to restart the equalization of the reception signal.

In accordance with this arrangement, when the equalization cannot be carried out with employment of the set tap arrangement, there is such a nature that only the tap coefficient of the specific tap is sharply, or steeply changed, whereas since such a detection is made that the equalization cannot be carried out under the tap arrangement set by using this nature, the judgment of restarting the equalization can be made in high precision and with very simple calculations. Also, the equalization performance can be improved.

Also, fifth aspect of the present invention is featured by that the tap coefficient monitoring unit monitors only a specific tap, and when dispersion of a change amount of the tap coefficient exceeds a certain threshold value, the tap coefficient monitoring unit instructs that the tap arrangement of the equalizing filter unit is changed so as to restart the equalization of the reception signal.

In accordance with this arrangement, when the equalization cannot be carried out with employment of the set tap arrangement, there is such a nature that the tap coefficients of the plural taps are sharply, or steeply changed, whereas since such a detection is made that the equalization cannot be carried out under the tap arrangement set by using this nature, the judgment of restarting the equalization can be made in high precision and with very simple calculations. Also, the equalization performance can be improved.

Also, sixth aspect of the present invention is featured by that the tap arrangement control means for controlling the tap arrangement is further comprised of: an impulse response predicting device for predicting an impulse response of a transfer path; and the tap arrangement control means changes the tap arrangement of the equalizing filter unit in such a manner that the tap arrangement becomes suitable for the next impulse having a large pulse component in response to an impulse response predicted by a reference signal.

In accordance with this arrangement, the initially set tap arrangement is determined in such a manner that the incoming wave having the highest level component at the time instant when the reference signal is received is recognized as the main wave. In the case that the relationship among the levels of the respective incoming waves is changed due to the variation in the transfer path while the equalization is carried out, there is such a nature that the component of the incoming wave which may constituted the main wave at this time corresponds to the component of the incoming wave having the second highest level selected from the incoming waves when the reference signal is received. This probability is high. Since the tap arrangement is changed by using this nature while using the incoming wave having the second high-leveled component as the main wave, the tap arrangement can be changed without substantially increasing the calculation amount.

Also, seventh aspect of the present invention is featured by that the tap arrangement control means for controlling the tap arrangement is further comprised of: an impulse response predicting device for predicting an impulse response of a transfer path; and the tap arrangement control means changes the tap arrangement of the equalizing filter unit in such a manner that the tap arrangement becomes optimum with respect to an impulse response predicted by both the equalized output of the discriminator and a condition of the reception signal.

As a consequence, the impulse response of the transmission path is predicted, while using as the reference signal the equalized output of the section slightly before such a time instant when the detection is made of such a fact that the equalization cannot be carried out by using the set tap arrangement. Furthermore, the tap arrangement is changed by employing this prediction result. Accordingly, the tap arrangement can be more correctly changed, and furthermore, the equalization performance can be improved.

Also, eighth aspect of the present invention is featured by that in a mobile station wireless apparatus equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; and a tap coefficient monitoring unit for monitoring a tap coefficient of the equalizing filter unit; wherein: the tap arrangement of the equalizing filter unit is changed so as to restart a starting step of equalizing steps for equalizing a reception signal, depending upon a change state of the tap coefficient used while the reception signal is equalized.

With employment of the above-described arrangement, since the equalization of the reception signal is restarted from the starting step in such a case that the equalization cannot be carried out under the initially set tap arrangement, the equalization performance can be improved by changing such a tap arrangement even when the initially set tap arrangement becomes improper. As a consequence, even when the mobile station wireless apparatus is used in the large zone type mobile communication system and in the mobile communication system with the high transfer speed under such a circumstance that the frequency selective fading cannot be neglected, the reception performance can be brought into better performance.

Also, ninth aspect of the present invention is featured by that in a mobile station wireless apparatus equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; and a tap coefficient monitoring unit for monitoring a tap coefficient of the equalizing filter unit; wherein: the tap arrangement of the equalizing filter unit is changed so as to restart reception signal equalizing steps from a preselected step prior to the present step thereof while the reception signal is equalized, depending upon a change state of the tap coefficient during the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. As a consequence, the equalization performance realized when the variation of the transfer path is strongly produced can be improved. As a consequence, even when the mobile station wireless apparatus is used in the large zone type mobile communication system and in the mobile communication system with the high transfer speed under such a circumstance that the frequency selective fading cannot be neglected, the reception performance can be brought into better performance.

Also, tenth aspect of the present invention is featured by that in a mobile station wireless apparatus equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; and a tap coefficient monitoring unit for monitoring a tap coefficient of the equalizing filter unit; wherein: the tap arrangement of the equalizing filter unit is changed so as to restart reception signal equalizing steps from a preselected step prior to the present step thereof while the reception signal is equalized, depending upon a change state of the tap coefficient during the equalization of the reception signal; and further so as to repeatedly perform the operation, depending upon a change condition of the tap coefficient while restarting the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. Also, both the detection as to whether or not the equalization can be carried out and the restarting operation of the equalization are repeatedly performed. As a consequence, the equalization performance realized when the variation of the transfer path is strongly produced can be improved. As a consequence, even when the mobile station wireless apparatus is used in the large zone type mobile communication system and in the mobile communication system with the high transfer speed under such a circumstance that the frequency selective fading cannot be neglected, the reception performance can be brought into better performance.

Also, eleventh aspect of the present invention is featured by that in a mobile station wireless apparatus equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; a tap coefficient monitoring unit for monitoring a tap coefficient of the equalizing filter unit; and means for detecting a moving speed of the mobile station wireless apparatus; wherein: when the moving speed is higher than a preselected threshold value, the tap arrangement of the equalizing filter unit is changed so as to restart a starting step of equalizing steps for equalizing a reception signal, depending upon a change state of the tap coefficient used while the reception signal is equalized.

With employment of the above-described arrangement, since the equalization of the reception signal is restarted from the starting step in such a case that the equalization cannot be carried out under the initially set tap arrangement, the equalization performance can be improved by changing such a tap arrangement even when the initially set tap arrangement becomes improper. As a consequence, even when the mobile station wireless apparatus is used in the large zone type mobile communication system and in the mobile communication system with the high transfer speed under such a circumstance that the frequency selective fading cannot be neglected, the reception performance can be brought into better performance. Furthermore, when the moving speed of the mobile station wireless apparatus is delayed, since the variation of the transfer path is small, there is substantially no need to restart the equalization by changing the tap arrangement. While using this fact, the operation of the tap coefficient monitoring unit is stopped. As a result, even when the variation of the transfer path is small, the equalization performance can be improved, and also the low power consumption can be achieved.

Also, twelfth aspect of the present invention is featured by that in a mobile station wireless apparatus equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; a tap coefficient monitoring unit for monitoring a tap coefficient of the equalizing filter unit; and means for detecting a moving speed of the mobile station wireless apparatus; wherein: when the moving speed is higher than a preselected threshold value, the tap arrangement of the equalizing filter unit is changed so as to restart reception signal equalizing steps from a preselected step prior to the present step thereof while the reception signal is equalized, depending upon a change state of the tap coefficient during the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. As a consequence, the equalization performance realized when the variation of the transfer path is strongly produced can be improved. Furthermore, when the moving speed of the mobile station wireless apparatus is slow, since the variation of the transfer path is decreased, the operation of the tap coefficient monitoring unit is stopped. As a result, the equalization performance achieved in the case that the variation of the transfer path is decreased can be improved, and also the low power consumption can be realized.

Also, thirteenth aspect of the present invention is featured by that in a mobile station wireless apparatus equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; a tap coefficient monitoring unit for monitoring a tap coefficient of the equalizing filter unit; and means for detecting a moving speed of the mobile station wireless apparatus; wherein: when the moving speed is higher than a preselected threshold value, the tap arrangement of the equalizing filter unit is changed so as to restart reception signal equalizing steps from a preselected step prior to the present step thereof while the reception signal is equalized, depending upon a change state of the tap coefficient during the equalization of the reception signal; and further so as to repeatedly perform the operation, depending upon a change condition of the tap coefficient while restarting the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. Also, both the detection as to whether or not the equalization can be carried out and the restarting operation of the equalization are repeatedly performed. As a consequence, the equalization performance realized when the variation of the transfer path is strongly produced can be improved. Furthermore, when the moving speed of the mobile station wireless apparatus is slow, since the variation of the transfer path is decreased, the operation of the tap coefficient monitoring unit is stopped. As a result, the equalization performance achieved in the case that the variation of the transfer path is decreased can be improved, and also the low power consumption can be realized.

Also, fourteenth aspect of the present invention is featured by that in a base station wireless apparatus equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; and a tap coefficient monitoring unit for monitoring a tap coefficient of the equalizing filter unit; wherein: the tap arrangement of the equalizing filter unit is changed so as to restart a starting step of equalizing steps for equalizing a reception signal, depending upon a change state of the tap coefficient used while the reception signal is equalized.

With employment of the above-described arrangement, since the equalization of the reception signal is restarted from the starting step in such a case that the equalization cannot be carried out under the initially set tap arrangement, the equalization performance can be improved by changing such a condition that the initially set tap arrangement becomes improper due to some reason. As a consequence, even when the mobile station wireless apparatus is used in the large zone type mobile communication system and in the mobile communication system with the high transfer speed under such a circumstance that the frequency selective fading cannot be neglected, the reception performance can be brought into better performance.

Also, fifteenth aspect of the present invention is featured by that in a base station wireless apparatus equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; and a tap coefficient monitoring unit for monitoring a tap coefficient of the equalizing filter unit; wherein: the tap arrangement of the equalizing filter unit is changed so as to restart reception signal equalizing steps from a preselected step prior to the present step thereof while the reception signal is equalized, depending upon a change state of the tap coefficient during the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. As a consequence, the equalization performance realized when the variation of the transfer path is strongly produced can be improved. As a consequence, even when the mobile station wireless apparatus is used in the large zone type mobile communication system and in the mobile communication system with the high transfer speed under such a circumstance that the frequency selective fading cannot be neglected, the reception performance can be brought into better performance.

Also, sixteenth aspect of the present invention, is featured by that in a base station wireless apparatus equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; and a tap coefficient monitoring unit for monitoring a tap coefficient of the equalizing filter unit; wherein: the tap arrangement of the equalizing filter unit is changed so as to restart reception signal equalizing steps from a preselected step prior to the present step thereof while the reception signal is equalized, depending upon a change state of the tap coefficient during the equalization of the reception signal; and further so as to repeatedly perform the operation, depending upon a change condition of the tap coefficient while restarting the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. Also, both the detection as to whether or not the equalization can be carried out and the restarting operation of the equalization are repeatedly performed. As a result, the equalization performance realized when the variation of the transfer path is strongly produced can be improved. As a consequence, even when the mobile station wireless apparatus is used in the large zone type mobile communication system and in the mobile communication system with the high transfer speed under such a circumstance that the frequency selective fading cannot be neglected, the reception performance can be brought into better performance.

Also, seventeenth aspect of the present invention is featured by that in a mobile communication system having a base station and a mobile station, in which at least one of the base station and the mobile station is equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; and a tap coefficient monitoring unit for monitoring a tap coefficient of the equalizing filter unit; wherein: the tap arrangement of the equalizing filter unit is changed so as to restart a starting step of equalizing steps for equalizing a reception signal, depending upon a change state of the tap coefficient used while the reception signal is equalized.

With employment of the above-described arrangement, since the equalization of the reception signal is restarted from the starting step in such a case that the equalization cannot be carried out under the initially set tap arrangement, the equalization performance can be improved by changing such a tap arrangement even when the initially set tap arrangement is not optimum. As a consequence, the mobile communication system having high quality can be constituted without being adversely influenced by the frequency selective fading.

Also, eighteenth aspect of the present invention is featured by that in a mobile communication system having a base station and a mobile station, in which at least one of the base station and the mobile station is equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; and a tap coefficient monitoring unit for monitoring a tap coefficient of the equalizing filter unit; wherein: the tap arrangement of the equalizing filter unit is changed so as to restart reception signal equalizing steps from a preselected step prior to the present step thereof while the reception signal is equalized, depending upon a change state of the tap coefficient during the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. As a consequence, the equalization performance realized when the variation of the transfer path is strongly produced can be improved. As a consequence, the mobile communication system having high quality can be constituted without being adversely influenced by the frequency selective fading.

Also, nineteenth aspect of the present invention is featured by that in a mobile communication system having a base station and a mobile station, in which at least one of the base station and the mobile station is equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; and a tap coefficient monitoring unit for monitoring a tap coefficient of the equalizing filter unit; wherein: the tap arrangement of the equalizing filter unit is changed so as to restart reception signal equalizing steps from a preselected step prior to the present step thereof while the reception signal is equalized, depending upon a change state of the tap coefficient during the equalization of the reception signal; and further so as to repeatedly perform the operation, depending upon a change condition of the tap coefficient while restarting the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. Also, both the detection as to whether or not the equalization can be carried out and the restarting operation of the equalization are repeatedly performed. As a result, the equalization performance realized when the variation of the transfer path is strongly produced can be improved. As a consequence, the mobile communication system having high quality can be constituted without being adversely influenced by the frequency selective fading.

Also, twentieth aspect of the present invention is featured by that in a mobile communication system having a base station and a mobile station, in which the mobile station is equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; a tap coefficient monitoring unit for monitoring a tap coefficient of the equalizing filter unit; and means for detecting a moving speed of the mobile station wireless apparatus; wherein: when the moving speed is higher than a preselected threshold value, the tap arrangement of the equalizing filter unit is changed so as to restart a starting step of equalizing steps for equalizing a reception signal, depending upon a change state of the tap coefficient used while the reception signal is equalized.

With employment of the above-described arrangement, since the equalization of the reception signal is restarted from the starting step in such a case that the equalization cannot be carried out under the initially set tap arrangement, the equalization performance can be improved by changing such a tap arrangement even when the initially set tap arrangement is not optimum. Furthermore, when the moving speed of the mobile station wireless apparatus is slow, since the variation of the transfer path is small, there is substantially no need to restart the equalization by changing the tap arrangement. While using this fact, the operation of the tap coefficient monitoring unit is stopped. As a result, even when the variation of the transfer path is small, the equalization performance can be improved, and also the low power consumption can be achieved. As a consequence, the mobile communication system having high quality can be constituted without being adversely influenced by the frequency selective fading.

Also, twenty-first aspect of the present invention is featured by that in a mobile communication system having a base station and a mobile station, in which the mobile station is equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; a tap coefficient monitoring unit for monitoring a tap coefficient of the equalizing filter unit; and means for detecting a moving speed of the mobile station wireless apparatus; wherein: when the moving speed is higher than a preselected threshold value, the tap arrangement of the equalizing filter unit is changed so as to restart reception signal equalizing steps from a preselected step prior to the present step thereof while the reception signal is equalized, depending upon a change state of the tap coefficient during the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. As a consequence, the equalization performance realized when the variation of the transfer path is strongly produced can be improved. Furthermore, when the moving speed of the mobile station wireless apparatus is slow, since the variation of the transfer path is decreased, the operation of the tap coefficient monitoring unit is stopped. As a result, the equalization performance achieved in the case that the variation of the transfer path is decreased can be improved, and also the low power consumption can be realized. As a consequence, the mobile communication system having high quality can be constituted without being adversely influenced by the frequency selective fading.

Also, twenty-second aspect of the present invention is featured by that in a mobile communication system having a base station and a mobile station, in which the mobile station is equipped with a waveform equalizer capable of removing an adverse influence caused by frequency selective fading, the waveform equalizer is comprised of: an equalizing filter unit constructed by a delay circuit having a tap; a discriminator for decoding an output signal of the equalizing filter unit; tap arrangement control means for controlling a tap arrangement of the equalizing filter unit; a tap coefficient monitoring unit for monitoring a tap coefficient of the equalizing filter unit; and means for detecting a moving speed of the mobile station wireless apparatus; wherein: when the moving speed is higher than a preselected threshold value, the tap arrangement of the equalizing filter unit is changed so as to restart reception signal equalizing steps from a preselected step prior to the present step thereof while the reception signal is equalized, depending upon a change state of the tap coefficient during the equalization of the reception signal; and further so as to repeatedly perform the operation, depending upon a change condition of the tap coefficient while restarting the equalization of the reception signal.

With employment of the above-described arrangement, in such a case that the equalization cannot be carried out under the initially set tap arrangement due to the variation of the transfer path, after the structure of the equalizer suitable for the reception signal when being sensed has been changed without returning to the beginning of the reception signal, the equalization is restarted from a preselected equalizing step prior to the present equalizing step. Also, both the detection as to whether or not the equalization can be carried out and the restarting operation of the equalization are repeatedly performed. As a result, the equalization performance realized when the variation of the transfer path is strongly produced can be improved. Furthermore, when the moving speed of the mobile station wireless apparatus is delayed, since the variation of the transfer path is small, there is substantially no need to restart the equalization by changing the tap arrangement. While using this fact, the operation of the tap coefficient monitoring unit is stopped. As a result, even when the variation of the transfer path is small, the equalization performance can be improved, and also the low power consumption can be achieved. As a consequence, the mobile communication system having high quality can be constituted without being adversely influenced by the frequency selective fading.

DETAILED DESCRIPTION OF THE PREFERRED EMBODIMENTS

Figure 1:
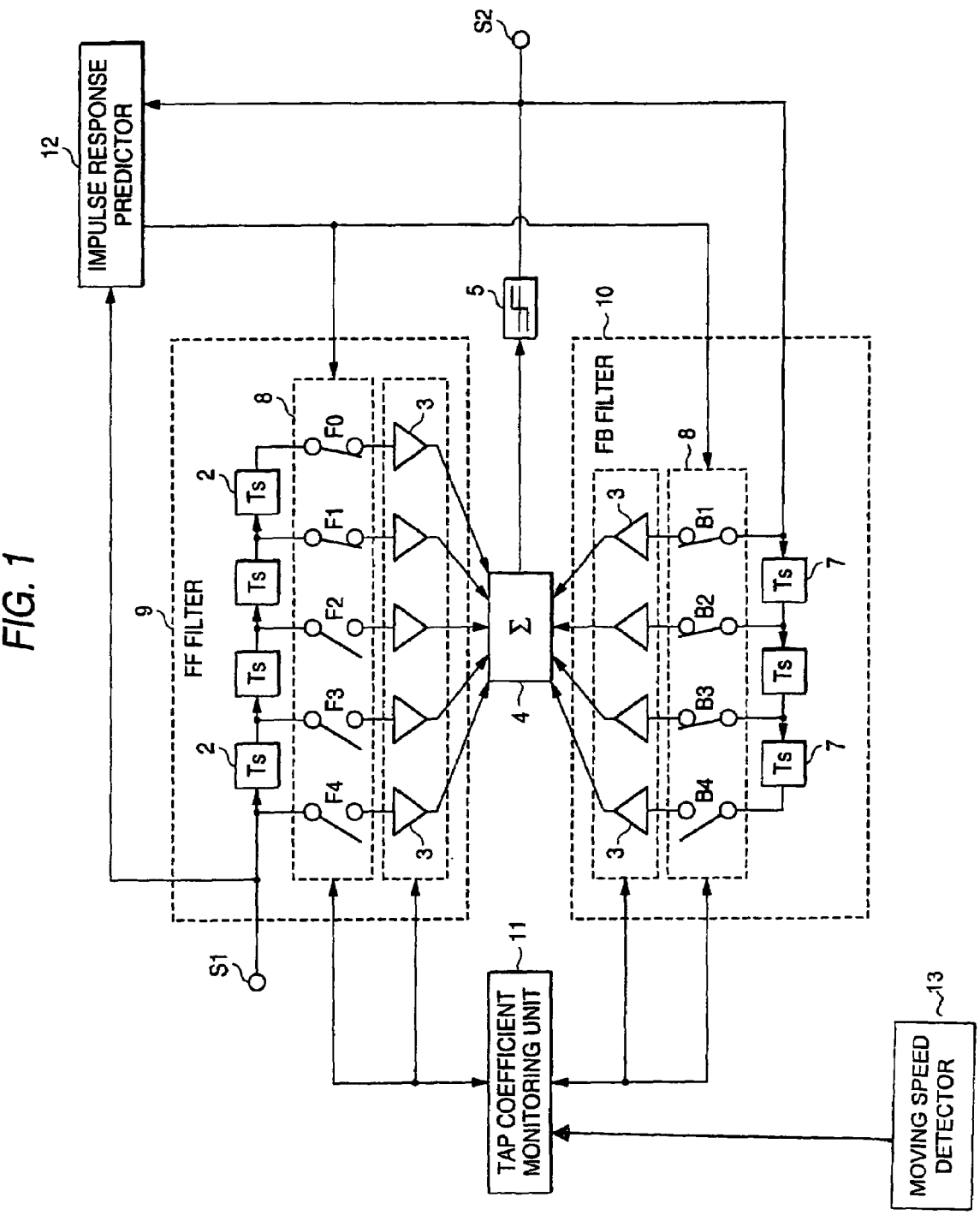
FIG. 1 is a block diagram for showing an arrangement of a waveform equalizer of the present invention.

FIG. 1 is a block diagram for showing an arrangement of a waveform equalizer which constitutes a major portion of the present invention.

This waveform equalizer is provided with an FF filter 9, an FB filter 10, a tap coefficient monitoring unit 11, an impulse response predictor 12, an adder 4, and a discriminator 5. The FF filter 9 contains a plurality of cascade-connected delay elements 2, and enters thereinto a reception signal S1. The respective delay elements 2 are connected via a tap arrangement control switch 8 to a weighting device 3. The output of this weighting device 3 is inputted to the adder 4. The output of the adder 4 is entered to the discriminator 5, and then the output of the discriminator 5 constitutes an equalization output S2. This equalization output S2 is inputted into a plurality of delay elements 7 of the FB filter 10. On the other hand, the FB filter 10 contains a plurality of cascade-connected delay elements 7. The respective delay elements 7 are connected via the tap arrangement control switch 8 to the weighting device 3. The output of this weighting device 3 is inputted to the adder 4.

The tap arrangements (F0 to F4, B1 to B4) of these equalizing filter units are controlled by the tap arrangement control switch 8. The FF filter 9 may contribute the equalization of the components of the preceding waves which are reached to this FF filter 9 earlier than the components of the main waves. The FB filter may contribute the equalization of the components of the delayed waves which are reached to this FB filter 10 later than the components of the main waves.

The tap coefficient monitoring unit 11 monitors the respective tap coefficients of the weighting device 3. The impulse response predictor 12 predicts an impulse response of a transfer path based upon the reception signal S1 and the equalization output S2.

Embodiment 1

Figure 2:
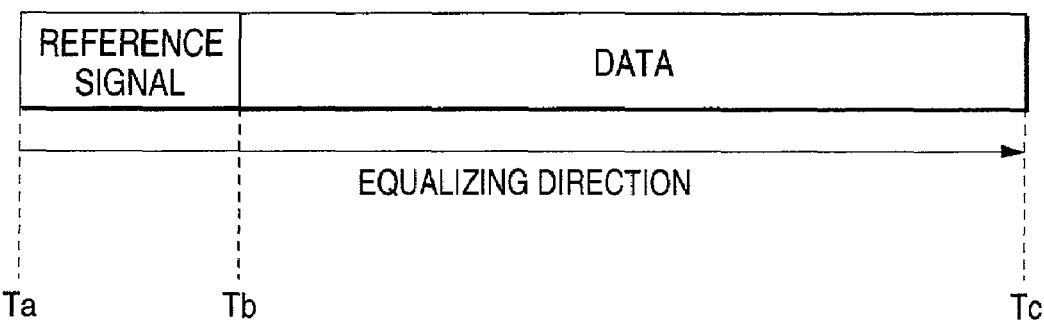
FIG. 2 is a diagram for indicating an example of a burst structure of a reception signal which constitutes an input of the waveform equalizer.
Figure 3:
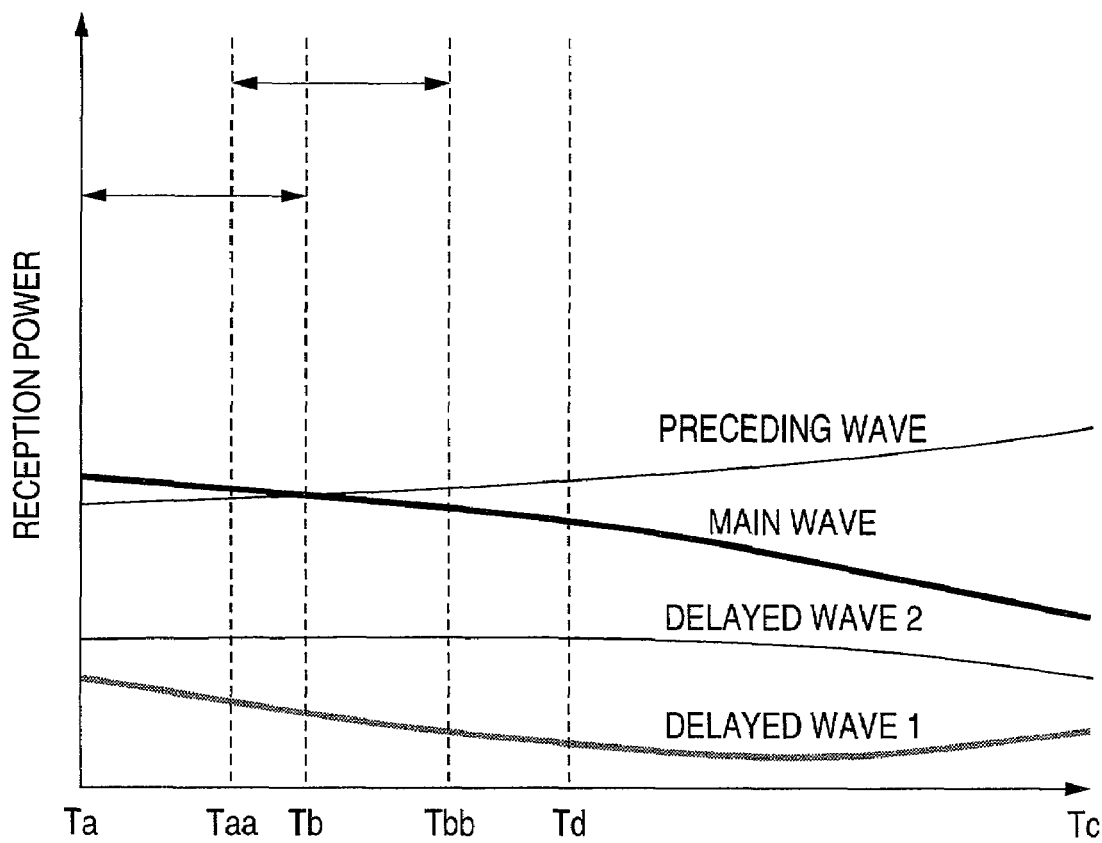
FIG. 3 is a diagram for showing an example 1 of reception power of incoming waves corresponding to the reception burst of FIG. 2.
Figures 4, 5:
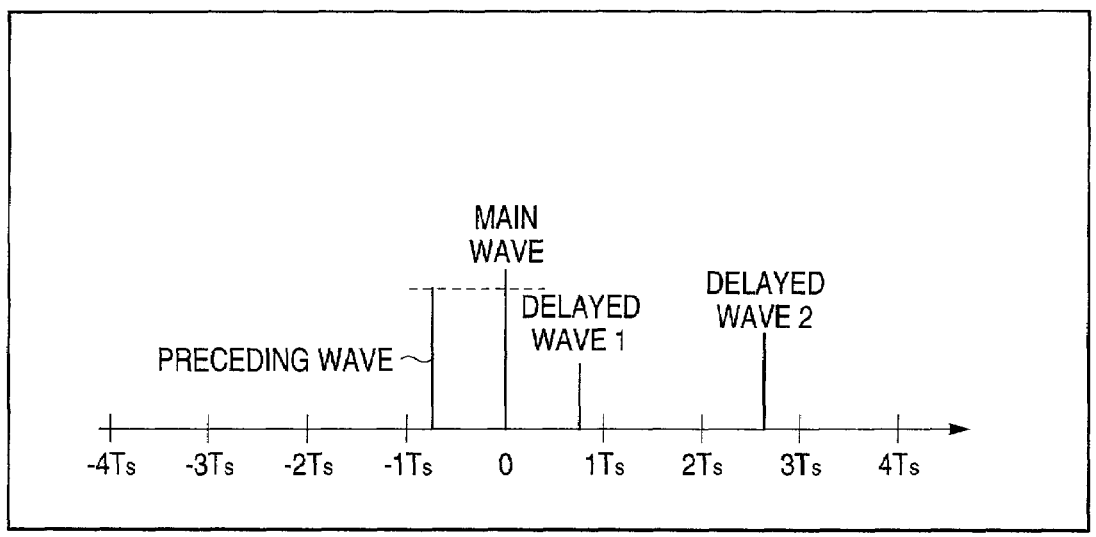
FIG. 4 is a diagram for indicating a predicted impulse response of a transfer path, which is predicted by using a reference signal of a section Ta to Tb of FIG. 3.
FIG. 5 is a diagram for indicating ON/OFF states of the respective taps of the tap arrangement control switch.

A description will now be made of a first embodiment of the present invention. In this description of the first embodiment, FIG. 1 to FIG. 10 are employed. FIG. 2 indicates an example of a burst structure of the reception signal which is inputted into the waveform equalizer. Symbols "Ta", "Tb", and "Tc" show reception time instants, respectively. A section "Ta" to "Tb" indicates the known reference signal, and a section "Tb" to "Tc" represents random data. FIG. 3 is a diagram for showing an example 1 of reception power of an incoming wave corresponding to the reception burst shown in FIG. 2, in which an equalization operation with respect to such an incoming wave is considered. FIG. 4 is a diagram for representing a predicted impulse response of a transfer path, which is predicted by employing the reference signal of the section "Ta" to "Tb". In FIG. 4, since a component of a preceding wave which is temporally advanced with respect to a main wave is present within 1 symbol time, a total tap number of the FF filter 9 may be sufficiently 2 taps (=1+1). Also, since all of components of delayed waves which are temporally delayed with respect to the main wave, a total tap number of the FB filter 10 may be sufficiently 3 taps.

FIG. 5 is a diagram for indicating ON/OFF states of the respective taps (F0 to F4, B1 to B4) of the tap arrangement control switch 8. As previously explained, if the taps of the tap arrangement control switch 8 are set to such ON/OFF states as indicated in FIG. 5(A), then it is possible to form an optimum tap arrangement of the waveform equalizer with respect to the predicted impulse response shown in FIG. 4.

After the respective taps are set by the tap arrangement control switch 8, the reception signal S1 is sequentially stored in the respective delay elements 2 provided on the side of the FF filter 9, and then, the weighting operation by the tap coefficient of the weighting device 3 is carried out only for such a tap output that the respective taps of the tap arrangement control switch 8 are turned ON. As a result, the weighted outputs are entered to the adder 4. Furthermore, the output of the adder 4 is entered to the discriminator 5, and then, the symbol of this input signal is judged, so that the equalization output S2 is obtained. At the same time, this equalization output S2 is sequentially stored into the respective delay elements 7 provided on the side of the FB filter 10, and then, the weighting operation by the tap coefficient of the weighting device 3 is carried out only for such a tap output that the respective taps of the tap arrangement control switch 8 are turned ON. As a result, the weighted outputs are entered to the adder 4. While the above-described equalization operation is carried out, the respective tap coefficients of the weighting device 3 are sequentially updated in such a manner that the errors produced between the signal input to the discriminator 5 and the symbol output equal to the judgment results of the discriminator 5 can be minimized.

Then, as to the respective tap coefficients of this weighting device 3, both the power and the change conditions thereof are continuously monitored by the tap coefficient monitoring unit 11. Then, when it is so judged that the equalization operation of the reception signals cannot be furthermore carried out based upon the tap coefficient information sensed by this tap coefficient monitoring unit 11, the tap arrangement control switch 8 is changed, and the equalization operation is restarted from the beginning signal portion of the reception signal.

Figure 6:
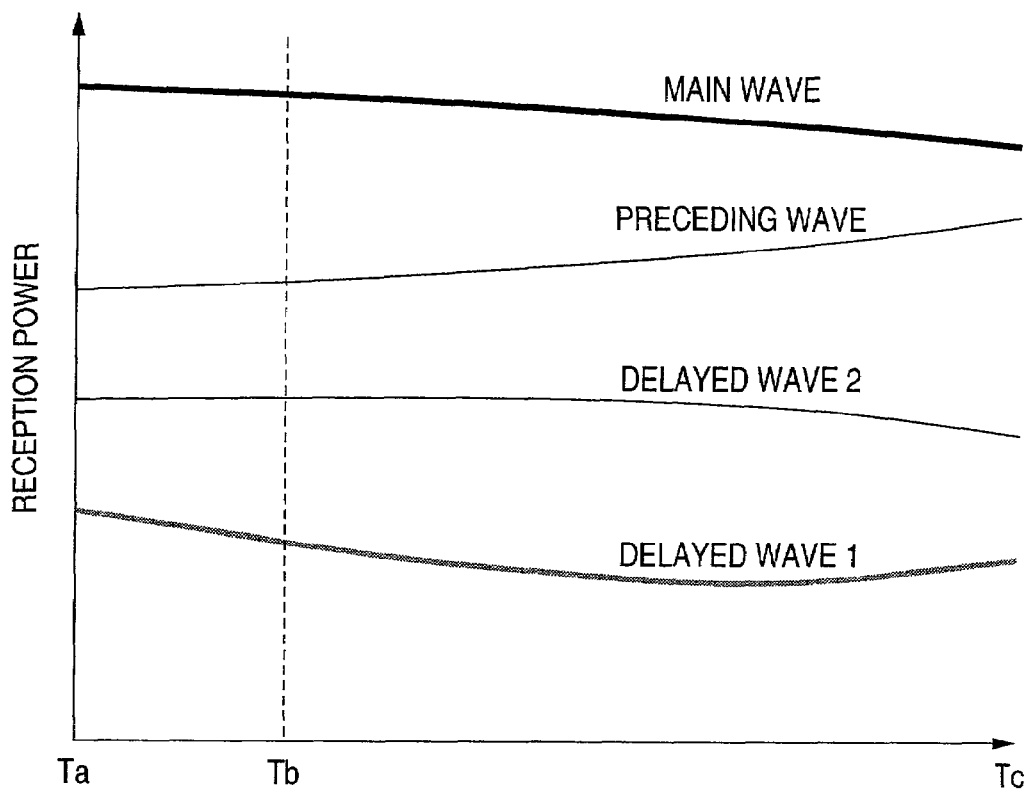
FIG. 6 is a diagram for showing an example 2 of reception power of incoming waves corresponding to the reception burst of FIG. 2.
Figure 7:
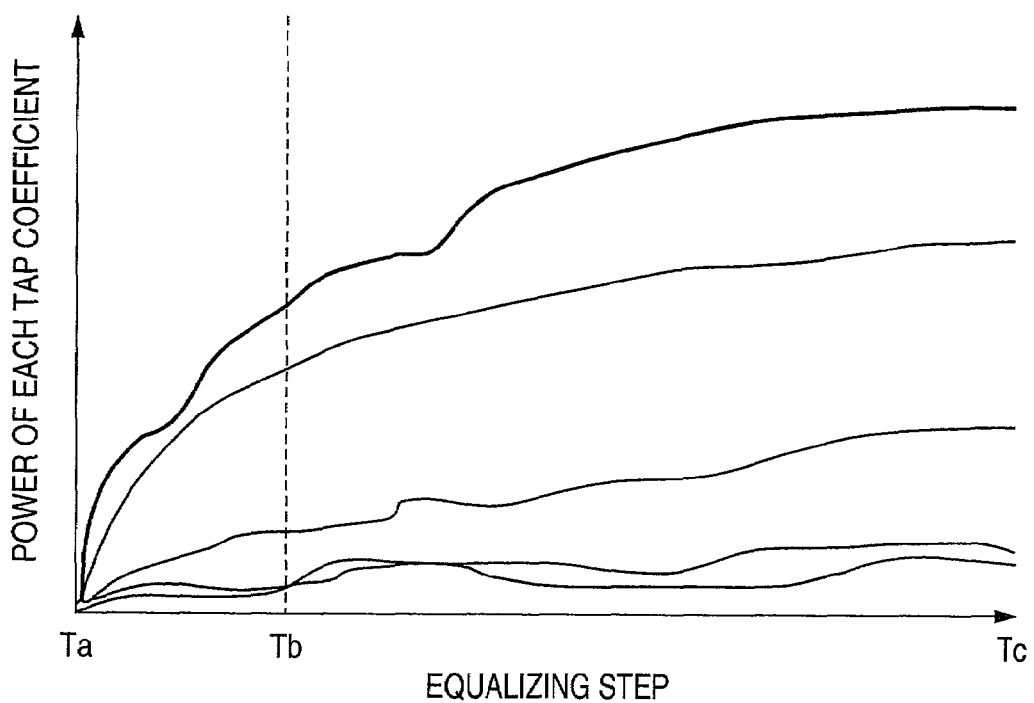
FIG. 7 is a diagram for representing a content of a tap coefficient sensed by a tap coefficient monitoring unit with respect to the reception power example 2 of the incoming waves of FIG. 6.

In this case, a relationship is considered between tap coefficient information of the weighting device 3 sensed by the tap coefficient monitoring unit 11 and equalization performance of the equalizer. FIG. 6 is a diagram for showing an example 2 of reception power of an incoming wave corresponding to the reception burst of FIG. 2. It is now assumed that the reception power of the incoming wave corresponding to the reception burst of FIG. 2 is brought into such a condition that the variation of the transfer path is substantially negligible. FIG. 7 is a diagram for indicating a content of a tap coefficient sensed by the tap coefficient monitoring unit 11 with respect to the example 2 of the reception power of the incoming wave shown in FIG. 6. At this time, in the tap coefficient monitoring unit 11, power of the respective tap coefficients of the weighting device 3 is sensed as represented in FIG. 7 with respective of the equalizing steps. In FIG. 7, since there is substantially no variation in the transfer path, it can be seen such a condition that the power of the tap coefficient is smoothly converged with respect to a certain constant value. In such a case, the equalizer can be operated under normal condition over the entire time of the reception burst.

Figure 8:
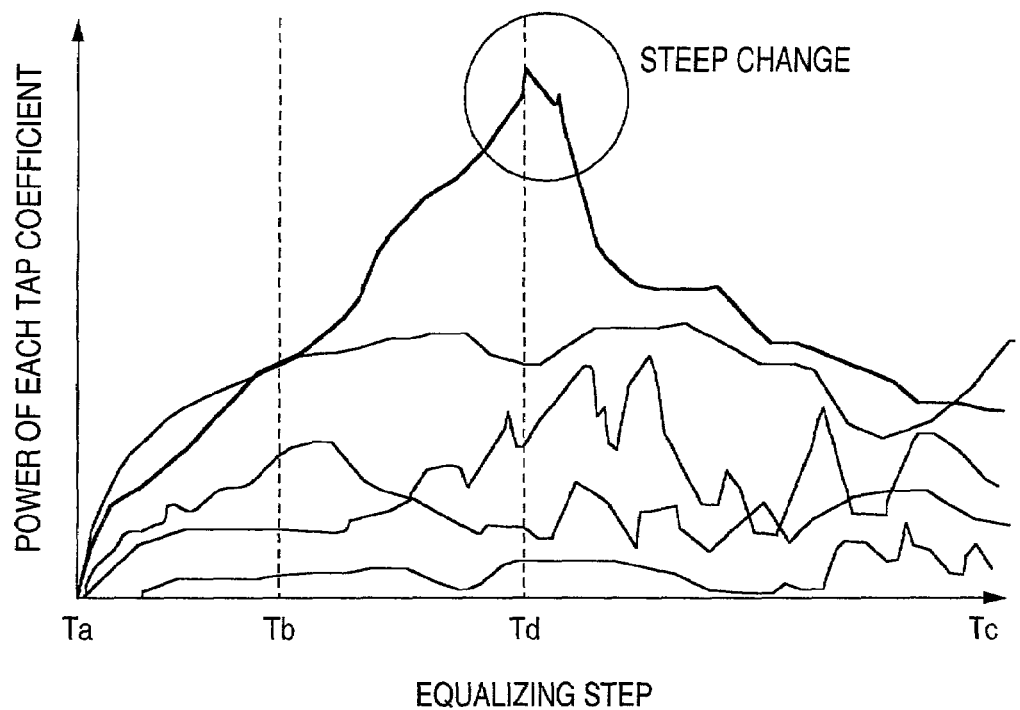
FIG. 8 is a diagram for representing a content of a tap coefficient sensed by a tap coefficient monitoring unit with respect to the reception power example 1 of the incoming waves of FIG. 3.

On the other hand, the following assumption is made. That is, while the reception power of the incoming wave corresponding to the reception burst of FIG. 2 is indicated in FIG. 3, the power of the main wave is gradually decreased due to the variation of the transfer path, and the power of the preceding wave is reversed with respect to the power of the main wave while the reception burst appears. FIG. 8 is a diagram for indicating a content of a tap coefficient sensed by the tap coefficient monitoring unit 11 with respect to the example 1 of the reception power of the incoming wave shown in FIG. 3. At this time, in the tap coefficient monitoring unit 11, power of the respective tap coefficients of the weighting device 3 is sensed as represented in FIG. 8 with respective of the equalizing steps. In FIG. 8, it can be seen such a condition that the power of the tap coefficient is steeply changed which corresponds to the main wave at a time instant "Td." As apparent from FIG. 3, this is because the main wave which has contained the maximum level in the predicted impulse response (FIG. 4) of the section Ta to Tb is revered with respect to the level of the preceding wave in the time ranges before/after this time instant "Td." As a result, the equalization operation cannot be carried out by the ON/OFF setting condition of the tap arrangement control switch 8 shown in FIG. 5(A).

In such a case that a tap coefficient of such a specific tap is steeply changed, since the impulse response level must be reversed, this level reversing phenomenon may be used as a chance for restarting the equalization operation. In this case, since the tap coefficient monitoring unit 11 may monitor only the specific tap, the waveform equalizer can be realized with substantially no increase of the calculation amount.

Also, it can be seen from the comparison between FIG. 7 and FIG. 8 that dispersion of changing amounts of the power of the respective tap coefficients becomes large. Since the dispersion of the power changing amounts of the respective tap coefficients is especially increased at time instants before/after the time instant "Td" shown in FIG. 8, this dispersion of the power changing amount of the tap coefficients may constitute a chance for restarting the equalization operation from the beginning. In this case, a proper threshold value may be set with respect to the dispersion of the power changing amount.

Figure 9:
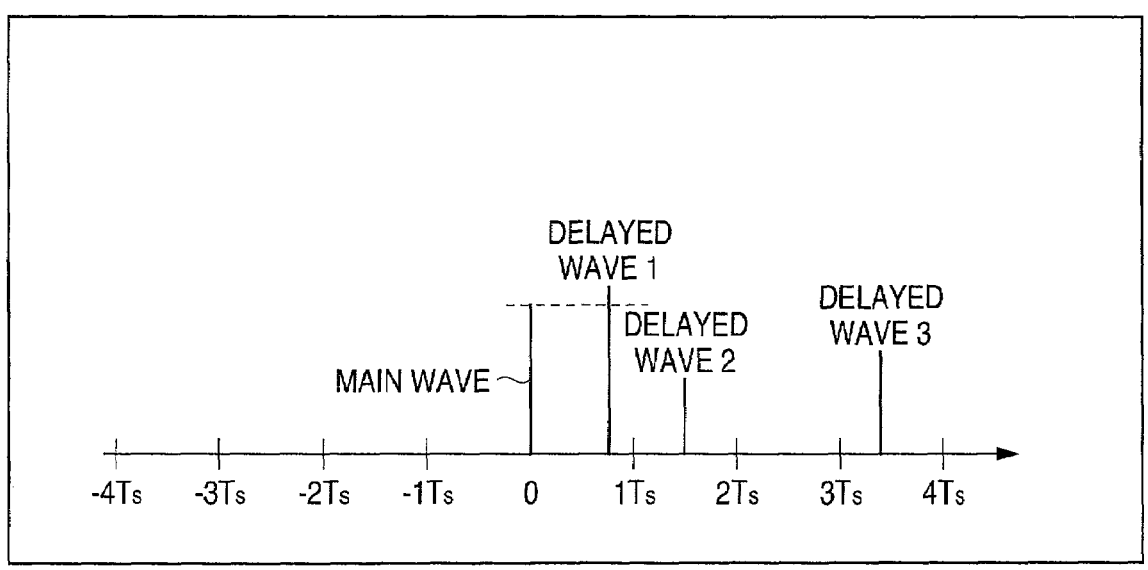
FIG. 9 is a diagram for showing another analysis method of the predicted impulse response of the transfer path of FIG. 4.

Next, a description will be made of a decision for a new tap arrangement in such a case that the equalization operation is restarted from the first signal portion of the reception signal. FIG. 9 is a diagram for indicating another analysis condition (namely, first analysis method) of a predicted impulse response with respect to the transfer path shown in FIG. 4.

In this first analysis method, the new tap arrangement is determined as follows: While a wave having a second highest level is recognized as the main wave in the impulse response of the transfer path, which is predicted from the reference signal of the section Ta to Tb of the reception burst shown in FIG. 2, the tap coefficient is newly determined. This first analysis method is established from the below-mentioned nature. That is, there is a large probability that when a level change occurs in the relationship among the levels of the respective incoming waves due to the variation in the transfer path during the equalization operation, such a component of a wave which may constitute the main wave at this stage is equal to the second highest-leveled component of the incoming wave among the incoming waves at the time while the reception signal is received. While observing FIG. 4, namely the predicted impulse response of the transfer path of the section Ta to Tb shown in FIG. 3, the wave having the second highest-leveled component is equal to the preceding wave. This second highest-leveled component becomes the highest-leveled component in a half way (approximately time instant "Tb") of the equalization operation (see FIG. 3). There is a strong trend in the actual transfer path.

As a consequence, while the new tap arrangement is determined, the predicted impulse response of the transfer path shown in FIG. 4 may be analyzed as represented in FIG. 9, and then, the ON/OFF setting operation of the tap arrangement control switch 8 may be changed. It should be noted that a main wave, a delayed wave 1, a delayed wave 2, and a delayed wave 3, shown in FIG. 9 correspond to the preceding wave, the main wave, the delayed wave 1, and the delayed wave 2, respectively, indicated in FIG. 3 and FIG. 4. Since there is no such a preceding wave component which is temporally advanced from the main wave in FIG. 9, it can be seen that a total tap number of the FF filter 9 may be sufficiently selected to be 1 tap (=0+1). Also, since all of the delay wave components which are temporally delayed with respect to the main wave are present within 4-symbol time, it can be seen that a total tap number of the FB filter 10 may be sufficiently selected to be 4 taps. FIG. 5(B) shows the setting content of the tap arrangement control switch 8 used to newly set the tap arrangement in the above-described tap determination manner. When the equalization operation is restarted from the beginning (time instant "Ta" of FIG. 3) of the reception signal by using this newly set tap arrangement, the equalization performance can be improved.

Figure 10:
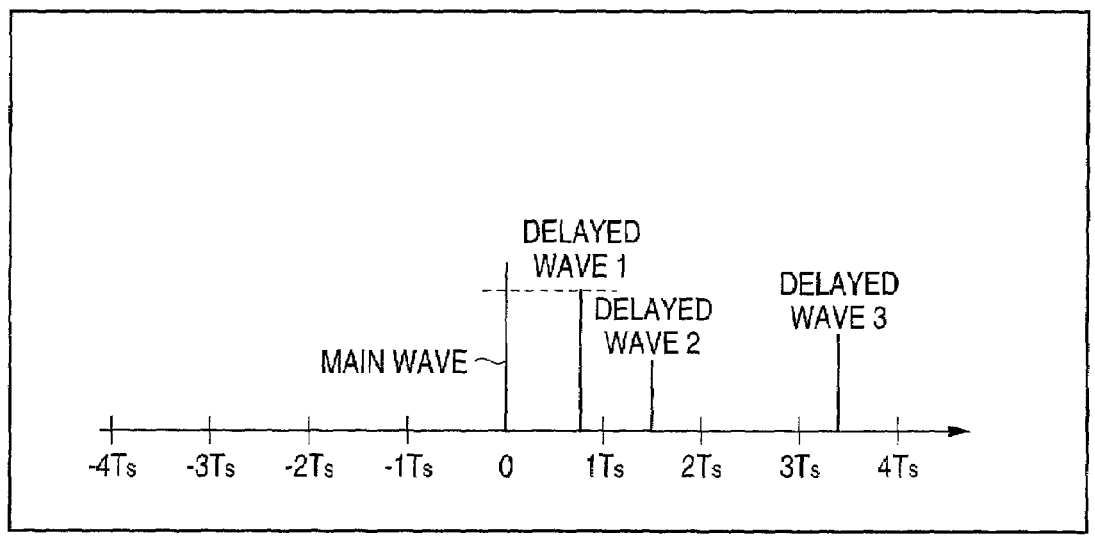
FIG. 10 is a diagram for indicating a predicted impulse response of a transfer path, which is predicted by employing an equalization output of a section Taa to Tbb of FIG. 3.

FIG. 10 is a diagram for indicating another analysis condition (second analysis method) of a predicted impulse response of a transfer path, which is predicted by employing the equalization output S2 of a section "Taa" to "Tbb" shown in FIG. 3. In this second analysis method, an impulse response of a transfer path is predicted by using as the reference signal, such an equalization output of a section which is slightly and temporally advanced (lead) from such a detection time instant when the equalization operation cannot be carried out by using the previously set tap arrangement, and then, the tap arrangement is determined based upon this predicted impulse response. This second analysis method is designed so as to determine the tap arrangement in higher precision than that of the first analysis method as follows. That is, while the equalization output S2 is correct and is assumed as the reference signal, the impulse response of the transfer path at the time when the equalization operation cannot be carried out is directly predicted. In other words, the impulse predicting device 12 predicts the impulse response of the transfer path based upon a correlation between the equalization output S2 in the section "Taa" to "Tbb" and the reception signal S1 in the section "Taa" to "Tbb". This section corresponds to a time range which is temporally advanced from the time instant "Td" in FIG. 3 when it is so judged that the equalizer cannot be operated. This predicted impulse response is indicated in FIG. 10, the ON/OFF states of the tap arrangement control switch 8 are set as indicated in FIG. 5(B), and then, the equalization operation is restarted from the beginning (time instant "Ta" of FIG. 3) of the reception signal. As a result, the equalization performance can be improved. It should be noted that a main wave, a delayed wave 1, a delayed wave 2, and a delayed wave 3, shown in FIG. 10 correspond to the preceding wave, the main wave, the delayed wave 1, and the delayed wave 2, respectively, indicated in FIG. 3 and FIG. 4.

In the above-explained waveform equalizer of the first embodiment, when it is so detected that the equalization cannot be carried out, the equalization operation is restarted from the beginning of the reception burst. As a result, the equalization operation can be carried out in higher precision, as compared with that of the conventional waveform equalizer. There are many possibilities that optimum tap arrangements cannot be established when starting tap arrangements are determined under the following conditions. That is, a starting tap arrangement is determined from an impulse response of a transfer path, which is predicted by employing a reference signal whose CNR is small. Also, since levels of predicted impulse response among incoming waves compete with each other, any one of these competing incoming waves can be hardly determined as the main wave. However, the waveform equalizer according to this embodiment can especially achieve the great merit under such a condition.

Embodiment 2

Figure 11:
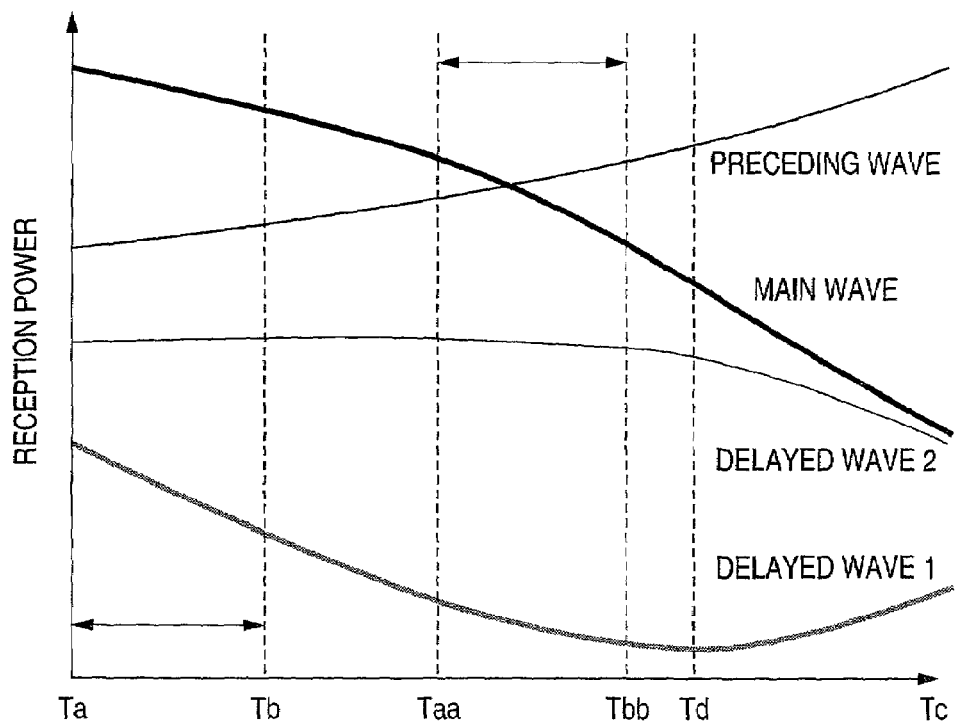
FIG. 11 is a diagram for showing an example 3 of reception power of incoming waves corresponding to the reception burst of FIG. 2.
Figure 12:
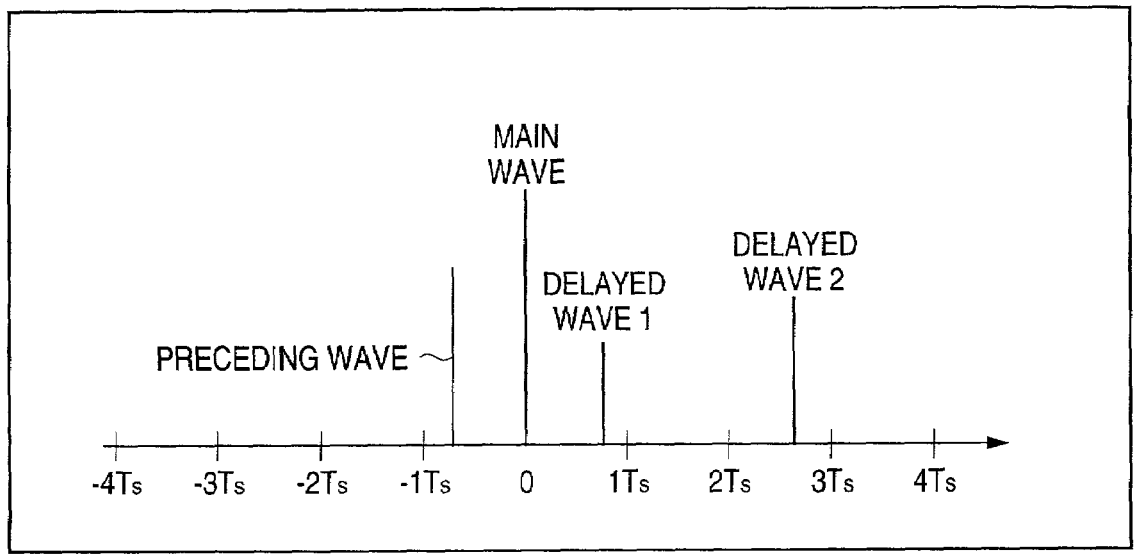
FIG. 12 is a diagram for indicating a predicted impulse response of a transfer path, which is predicted by employing a reference signal of a section Ta to Tb of FIG. 11.

A description will now be made of a second embodiment of the present invention. In this description of the embodiment, FIG. 1, FIG. 2, FIG. 5, and FIG. 11 to FIG. 14 are employed. FIG. 1 is a block diagram for showing an arrangement of a waveform equalizer of the present invention, which is identical to the above-explained arrangement and therefore, the description there of is omitted. FIG. 2 indicates an example of a burst structure of the reception signal which is inputted into the waveform equalizer. Symbols "Ta", "Tb", and "Tc" show reception time instants, respectively. A section "Ta" to "Tb" indicates the known reference signal, and a section "Tb" to "Tc" represents random data. FIG. 5 shows ON/OFF states of the tap arrangement control switch 8. FIG. 11 is a diagram for showing an example 3 of reception power of an incoming wave corresponding to the reception burst shown in FIG. 2. FIG. 12 is a diagram for representing a predicted impulse response of a transfer path, which is predicted by employing the reference signal of the section "Ta" to "Tb".

Now, considering an equalization operation with respect to such an impulse wave as shown in FIG. 11, a predicted impulse response thereof is indicated in FIG. 12. In FIG. 12, since a component of a preceding wave which is temporally advanced with respect to a main wave is present within 1 symbol time, a total tap number of the FF filter 9 may be sufficiently 2 taps (=1+1). Also, since all of components of delayed waves which are temporally delayed with respect to the main wave, a total tap number of the FB filter 10 may be sufficiently 3 taps. As previously explained, the taps of the tap arrangement control switch 8 are set to such ON/OFF states as indicated in FIG. 5(A). Therefore, it is possible to form an optimum tap arrangement of the waveform equalizer with respect to the predicted impulse response shown in FIG. 12.

In this case, the waveform equalizer of the embodiment is arranged as follows. That is, the equalization operation is restarted from the beginning of the reception signal, depending upon the tap coefficient information sensed by the tap coefficient monitoring unit 11. In contrast, the waveform equalizer of the second embodiment is so arranged that the equalization operation is restarted from a preselected step prior to the present step of the reception signal equalizing steps, depending upon tap coefficient information sensed by the tap coefficient monitoring unit 11.

The basic operation of the waveform equalizer according to the second embodiment is similar to that of the waveform equalizer according to the first embodiment, but only the position of the reception signal where the equalization operation is restarted is merely different between the first embodiment and the second embodiment. Also, a chance to restart the equalization operation by the waveform equalizer of the second embodiment is similar to that of the waveform equalizer of the first embodiment. That is, in such a case that a tap coefficient of a specific tap is steeply changed, and/or when such a detection is made that dispersion of tap coefficient changing amounts of plural taps exceeds a properly set threshold value.

As a consequence, a description will now be made of both a method for determining a new tap arrangement when an equalization operation is started and a starting position of the equalization operation with employment of the reception power example 3 of the incoming wave shown in FIG. 11. As apparent from FIG. 11, firstly, the main wave which has contained the maximum level in the predicted impulse response (FIG. 12) of the period "Ta" to "Tb" is revered with respect to the level of the preceding wave in the time ranges before/after this time instant "Td". As a result, the equalization operation cannot be carried out by the ON/OFF setting condition of the tap arrangement control switch 8 shown in FIG. 5(A).

Figure 13:
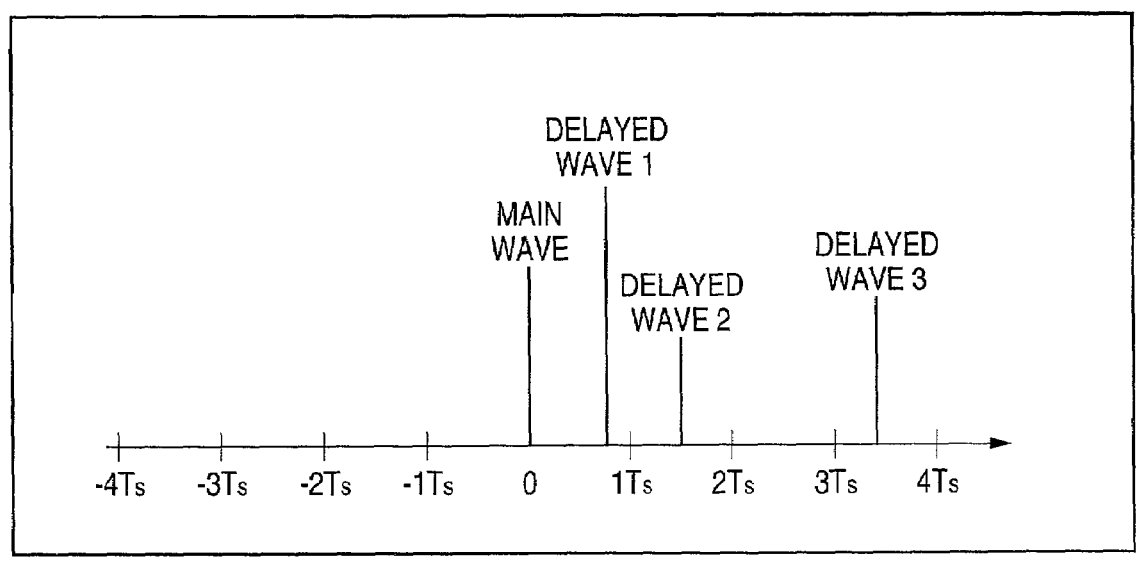
FIG. 13 is a diagram for showing another analysis method of the predicted impulse response of the transfer path of FIG. 12.

As a result, it is now assumed that the tap coefficient monitoring unit 11 judges at the time instant "Td" of FIG. 12 that the equalization operation cannot be further carried out. A description will now be made of a method for determining a new tap arrangement in such a case that the equalization operation is restarted from a certain equalizing step of the reception signal equalizing steps, which is prior to such a time instant when the judgement of non-equalization is made. FIG. 13 is a diagram for representing another analysis method (third analysis method) for the predicted impulse response of the transfer path shown in FIG. 12.

In this third analysis method, the new tap arrangement is determined as follows: While a wave having a second highest level is recognized as the main wave in the impulse response of the transfer path, which is predicted from the reference signal of the section Ta to Tb of the reception burst shown in FIG. 2, the tap coefficient is newly determined. This third analysis method is established from the below-mentioned nature. That is, there is a large probability that when a level change occurs in the relationship among the levels of the respective incoming waves due to the variation in the transfer path during the equalization operation, such a component of a wave which may constitute the main wave at this stage is equal to the second highest-leveled component of the incoming wave among the incoming waves at the time while the reception signal is received. While observing FIG. 12, namely the predicted impulse response of the transfer path of the section Ta to Tb shown in FIG. 11, the wave having the second highest-leveled component is equal to the preceding wave. This second highest-leveled component becomes the highest-leveled component in a half way (approximately time instant between "Taa" and "Tbb") of the equalization operation (see FIG. 11). There is a strong trend in the actual transfer path.

As a consequence, while the new tap arrangement is determined, the predicted impulse response of the transfer path shown in FIG. 12 may be analyzed as represented in FIG. 13, and then, the ON/OFF setting operation of the tap arrangement control switch 8 may be changed. It should be noted that a main wave, a delayed wave 1, a delayed wave 2, and a delayed wave 3, shown in FIG. 13 correspond to the preceding wave, the main wave, the delayed wave 1, and the delayed wave 2, respectively, indicated in FIG. 11 and FIG. 12.

Since there is no such a preceding wave component which is temporally advanced from the main wave in FIG. 13, it can be seen that a total tap number of the FF filter 9 maybe sufficiently selected to be 1 tap (=0+1) Also, since all of the delay wave components which are temporally delayed with respect to the main wave are present within 4-symbol time, it can be seen that a total tap number of the FB filter 10 may be sufficiently selected to be 4 taps. FIG. 5(B) shows the setting content of the tap arrangement control switch 8 used to newly set the tap arrangement in the above-described tap determination manner.

Then, with employment of such a set tap arrangement, when the equalization operation is restarted from a preselected equalizing step (namely, time instant "Taa" of FIG. 11) of the reception signal equalizing steps after such a judgement is made that the equalization operation cannot be carried out, the equalization performance can be improved.

Figure 14:
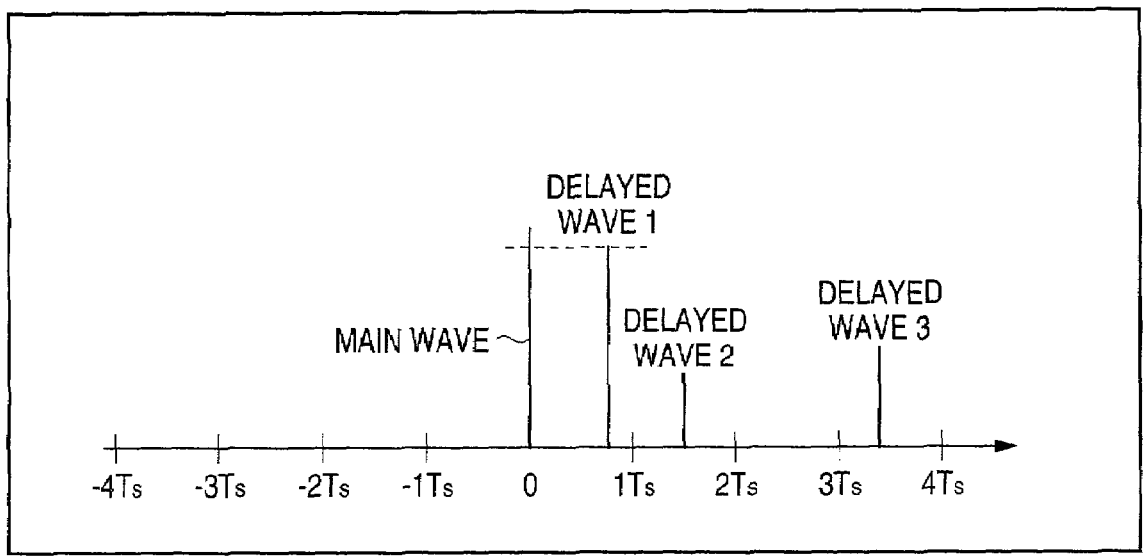
FIG. 14 is a diagram for indicating a predicted impulse response of a transfer path, which is predicted by employing an equalization output of a section Taa to Tbb of FIG. 11.
Figure 15:
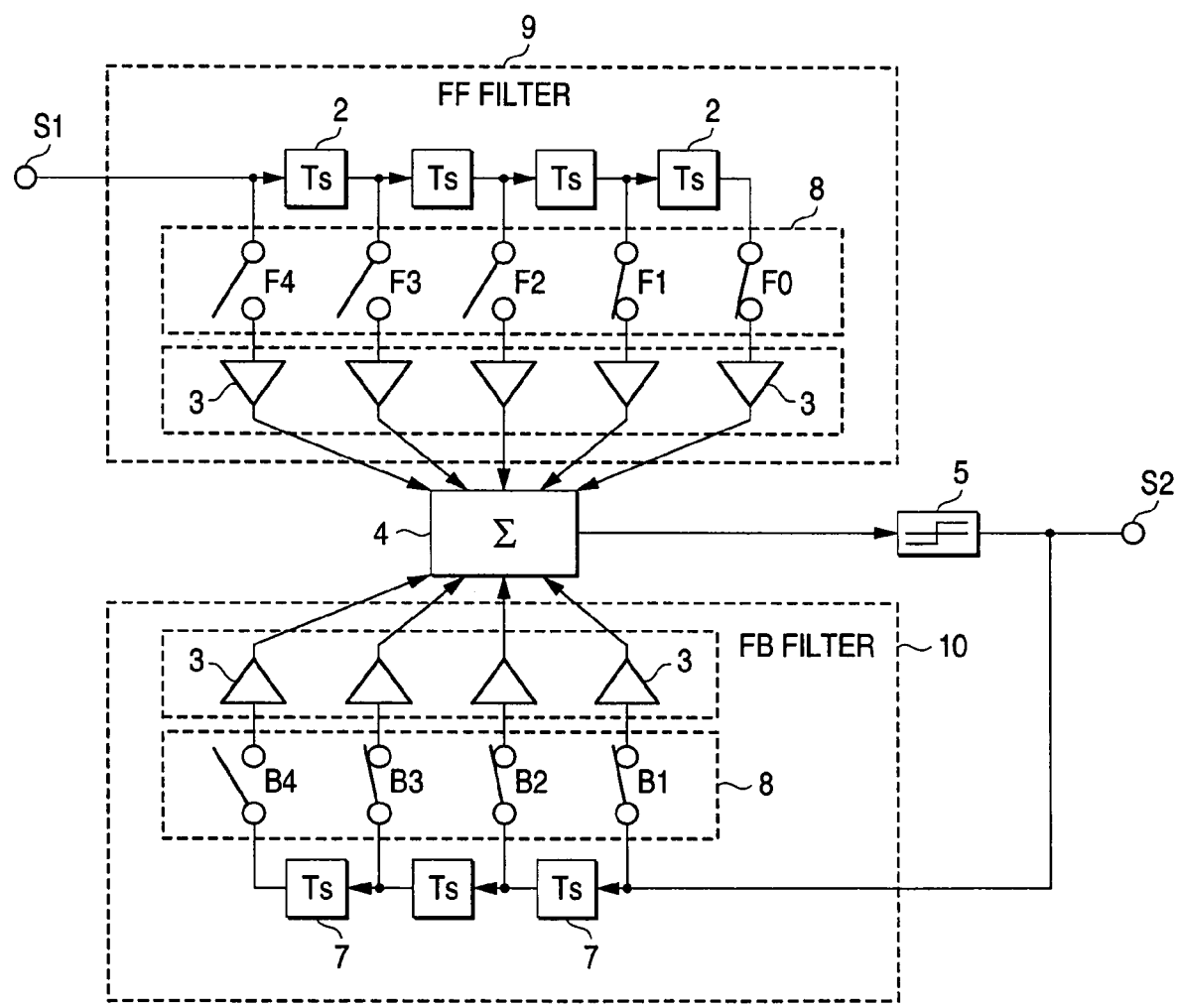
FIG. 15 is a block diagram for showing the arrangement of the conventional waveform equalizer.
Figures 16, 17:
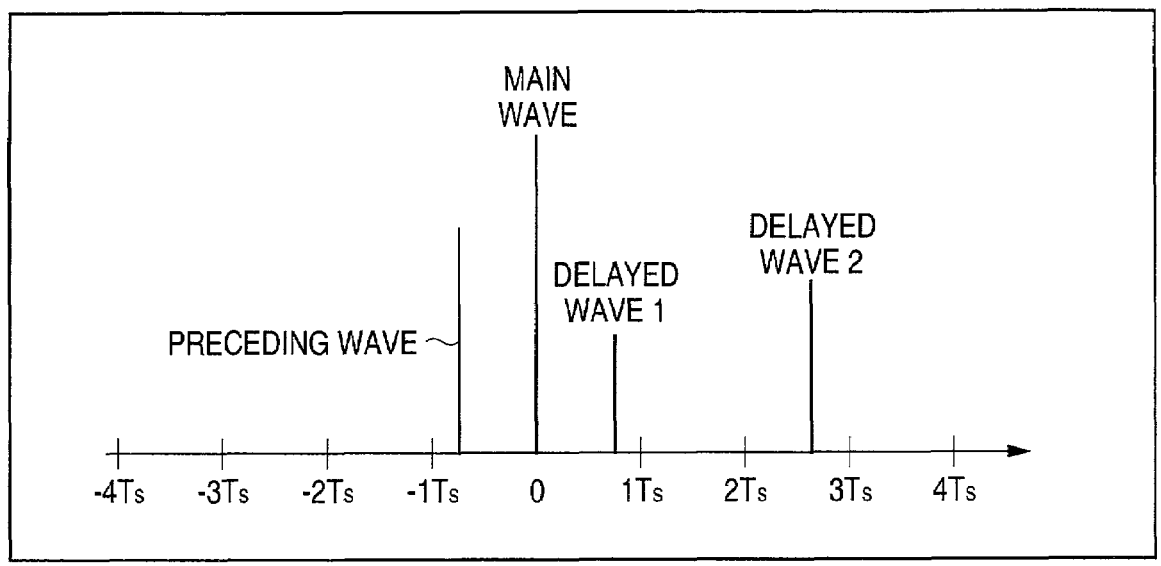
FIG. 16 is a diagram for indicating a predicted impulse response of a transfer path, which is predicted by employing a reference signal of a section Ta to Tb of FIG. 6.
FIG. 17 is a diagram for indicating ON/OFF states of the respective taps of the tap arrangement control switch.

Next, a fourth analysis method is explained. FIG. 14 is a diagram for indicating a predicted impulse response of a transfer path, which is predicted by employing the equalization output S2 of a section "Taa" to "Tbb" shown in FIG. 11. In this fourth analysis method, an impulse response of a transfer path is predicted by using as the reference signal, such an equalization output of a section which is slightly and temporally advanced (lead) from such a detection time instant when the equalization operation cannot be carried out by using the previously set tap arrangement, and then, the tap arrangement is determined based upon this predicted impulse response. This second analysis method is designed so as to determine the tap arrangement in higher precision than that of the first analysis method as follows. That is, while the equalization output S2 is correct and is assumed as the reference signal, the impulse response of the transfer path at the time when the equalization operation cannot be carried out is directly predicted. In other words, the impulse predicting device 12 predicts the impulse response of the transfer path based upon a correlation between the equalization output S2 in the section "Taa" to "Tbb" and the reception signal S1 in the section "Taa" to "Tbb". This section corresponds to a time range which is temporally advanced from the time instant "Td" in FIG. 11 when it is so judged that the equalizer cannot be operated. This predicted impulse response is indicated in FIG. 14, the ON/OFF states of the tap arrangement control switch 8 are set as indicated in FIG. 5(B), and then, the equalization operation is restarted from a preselected equalizing step (time instant "Taa" of FIG. 11) of the reception signal after such a judgement is made that the equalization operation cannot be done. As a result, the equalization performance can be improved. It should be noted that a main wave, a delayed wave 1, a delayed wave 2, and a delayed wave 3, shown in FIG. 14 correspond to the preceding wave, the main wave, the delayed wave 1, and the delayed wave 2, respectively, indicated in FIG. 11 and FIG. 12.

In the above-explained waveform equalizer of the second embodiment, when it is so detected that the equalization operation cannot be carried out, the equalization operation is restarted from a preselected equalizing step of the reception signal equalizing steps. As a result, the equalization operation can be carried out in higher precision, as compared with that of the conventional waveform equalizer. In such a case that the variation of the transfer path is large as shown in FIG. 11, the impulse response of the transfer path when the data of the section Tb to Tc shown in FIG. 2 is equalized is changed time to time. As a result, the impulse response while the equalization operation is being carried out is greatly made different from the impulse response of the transfer path, which is predicted by using the reference signal of FIG. 2. In particular, the waveform equalizer of the second embodiment may achieve a great merit under such a condition. The waveform equalizer of the second embodiment does not restart the equalization operation from the beginning of the reception signal, but restarts a certain equalizing step of the reception signal equalizing steps. As a result, while the following characteristics to the transfer path can be improved, a total calculation amount of this waveform equalizer can be reduced, as compared with that of the first embodiment. Accordingly, the power consumption can be reduced and the apparatus can be made compact. It should be noted that the restarting operation of the equalizing operation is performed only one time in the second embodiment. Alternatively, in such a case that the tap coefficient of the waveform equalizer is monitored during the restarting operation and it is so judged that the equalization operation cannot be again carried out, this restarting operation of the equalization operation may be repeatedly carried out. Since such an alternative equalization operation is executed, the equalization performance may be improved even in such a case that the variation of the transfer path is very strong, or the data of the section Tb to Tc shown in FIG. 2 becomes very longer than the reference signal of the section Ta to Tb.

Embodiment 3

In a large zone type mobile communication system, or a high-speed mobile communication system, when a plurality of electromagnetic transfer paths are established between base stations and mobile stations, an adverse influence caused by such a frequency selective fading phenomenon that interference between codes occurs due to a difference in these transfer paths. Both the above-described waveform equalizer according to the first embodiment and the above-explained waveform equalizer according to the second embodiment can solve the above-described problem. As a consequence, both a mobile station wireless apparatus using the waveform equalizer of the present invention and also a base station wireless apparatus using this waveform equalizer may constitute terminal/base station infrastructure capable of realizing better reception performance. Moreover, a mobile communication system arranged by combining these mobile station wireless apparatus and base station wireless apparatus with each other may constitute a high-quality mobile communication system which is not adversely influenced by the frequency selective fading phenomenon.

In addition, since the mobile station wireless apparatus is equipped with a means for detecting a moving speed 13 (velocity) of this terminal, the operation of the tap coefficient monitoring unit 11 employed in the waveform equalizer of the present invention, which is mounted on this wireless apparatus, may be ON/OFF-controlled. As this means for detecting the moving speed of this terminal, such a detector may be employed which reads a speed value of a speed meter mounted on an automobile. Alternatively, when a portable terminal is used, such a detector may be used. That is, when this portable terminal is used while a user operates this portable terminal, the user may manually set a walk move to this detector.

If the moving speed of the terminal is slower than a preselected threshold value, or is set to the walk mode, then the tap arrangement need not be changed so as to restart the equalization operation, because the variation of the transfer path is small. As a consequence, the operation of the tap coefficient monitoring unit is stopped. Therefore, it is possible to avoid the restarting operation of the erroneous equalizing operation by the tap coefficient monitoring unit 11, so that the equalization performance can be improved. At the same time, since the tap coefficient monitoring unit 11 is not operated, the wireless apparatus can be driven under low power consumption. On the other hand, in the case that the moving speed of the terminal is faster than a predetermined threshold value, or in the case that the terminal is not set to the walk mode, there is such a reception signal, that since the variation of the transfer path is large, the tap arrangement must be changed so as to restart the equalization operation. As a result, the tap coefficient monitoring unit 11 is caused to be operated.

As previously explained, since the mobile station wireless apparatus is equipped with the means for detecting the moving speed of this terminal, both the equalization performance can be improved, and also the reduction of the power consumption of the terminal can be realized, depending upon the use condition.

In accordance with the waveform equalizer according to first aspect of the present invention, while the tap coefficient is monitored during the equalization operation of the reception signal, since the equalization of the reception signal is restarted from the starting step in such a case that the equalization operation cannot be carried out under the initially-set tap arrangement, the equalization performance can be improved. As a consequence, there are many possibilities that optimum tap arrangements cannot be established when starting tap arrangements are determined under the following conditions. That is, the starting tap arrangement is determined from the impulse response of the transfer path, which is predicted by employing the reference signal whose CNR is small. Also, since the levels of the predicted impulse response among the incoming waves competed with each other, any one of these competing incoming waves can be hardly determined as the main wave. However, this waveform equalizer can especially achieve the great merit under such a condition, since the necessary tap arrangement is sufficiently rearranged to restart the equalization operation.

In accordance with the waveform equalizer according to second aspect of the present invention, while the tap coefficient is monitored during the equalization operation of the reception signal, when the equalization operation under the initially-set tap arrangement cannot be carried out, the equalization operation is restarted from a preselected equalizing step of the reception signal equalizing steps from the present time instant when this fact is sensed. As a result, the waveform equalization by the waveform equalizer can be carried out in better performance. In other words, this waveform equalizer does not restart the equalization operation from the beginning of the reception signal, but restarts a certain equalizing step of the reception signal equalizing steps from the present time instant when this fact is sensed. As a result, while the following characteristic to the transfer path ca be improved, a total calculation amount of this waveform equalizer can be reduced. Furthermore, the power consumption can be reduced and the apparatus can be made compact.

In accordance with the waveform equalizer according to third aspect of the present invention, while the tap coefficient is monitored during the equalization operation of the reception signal, when the equalization operation under the initially-set tap arrangement cannot be carried out, the equalization operation is restarted from a preselected equalizing step of the reception signal equalizing steps from the present time instant when this fact is sensed. Also, the tap coefficient is further monitored while the equalization operation is restarted. Thus, since both the sensing operation of the equalization operation and the restarting operation of this equalization operation are repeatedly carried out, the equalization performance can be improved even when the variation of the transfer path is very strong, or even when the received data is very longer than the reference signal.

Also, in accordance with the waveform equalizer of fourth aspect of the invention, this waveform equalizer is arranged to sense that the equalization operation cannot be carried out under such a tap arrangement set by utilizing the nature, that is, when the equalization operation cannot be carried out under the set tap arrangement, only the tap coefficient of a certain specific tap is steeply changed. As a result, the waveform equalizer can make the high-precision restarting judgement of the equalization operation with a very simple calculation, and further, can improve the equalization performance.

Also, in accordance with the waveform equalizer of fifth aspect of the invention, this waveform equalizer is arranged to sense that the equalization operation cannot be carried out under such a tap arrangement set by utilizing the nature, that is, when the equalization operation cannot be carried out under the set tap arrangement, the tap coefficients of the plural taps are largely changed every equalizing step. As a result, the waveform equalizer can make the high-precision restarting judgement of the equalization operation with a very simple calculation, and further, can improve the equalization performance.

Also, in accordance with the waveform equalizer of sixth aspect of the invention, this waveform equalizer is arranged the initially-set tap arrangement is determined in such a manner that the incoming wave having the highest level component at the time instant when the reference signal is received is recognized as the main wave. In the case that the relationship among the levels of the respective incoming waves is changed due to the variation in the transfer path while the equalization is carried out, there is such a nature that the component of the incoming wave which may constitute the main wave at this time corresponds to the component of the incoming wave having the second highest level selected from the incoming waves when the reference signal is received. This probability is high. Since the tap arrangement is changed by using this nature while using the incoming wave having the second high-leveled component as the main wave, the tap arrangement can be changed without substantially increasing the calculation amount.

Also, in accordance with the waveform equalizer of seventh aspect of the invention, this waveform equalizer is arranged the impulse response of the transmission path is predicted, while using as the reference signal the equalized output of the section slightly before such a time instant when the detection is made of such a fact that the equalization cannot be carried out by using the set tap arrangement. Furthermore, the tap arrangement is changed by employing this prediction result. Accordingly, the tap arrangement can be more correctly changed, and furthermore, the equalization performance can be improved.

The above-described waveform equalizer may be applied to the mobile station wireless apparatus, the base station wireless apparatus, and the mobile communication system. While the tap arrangement employed in the respective apparatuses can be optimally changed, even when the variation of the transfer path occurs, the equalization performance can be improved. With respect to various transfer conditions under which these apparatuses are employed under such an environment that the adverse influence by the frequency selective phasing phenomenon cannot be neglected, the reception performance can be improved. As a result, it is possible to construct the high-quality mobile communication system. More specifically, this may achieve a great effect in the large zone type mobile communication system and the mobile communication system with the high transfer speed.

Also, when the waveform equalizer is arranged so as to be controlled based upon the moving speed of the terminal, the tap coefficient control unit is operated for only required time period. As a result, the equalization performance can be improved, and furthermore, the lower power consumption of the apparatus can be realized.

What is claimed is:

1. A mobile station wireless apparatus equipped with a waveform equalizer capable of removing an adverse influence caused by frequency selective fading, said waveform equalizer comprising:
   an equalizing filter unit including a delay circuit with a tap;
   a discriminator which decodes an output signal of said equalizing filter unit;
   tap arrangement control means which controls a tap arrangement of said equalizing filter unit;
   a tap coefficient monitoring unit which monitors a tap coefficient of said equalizing filter unit; and
   detector means which detects a moving speed of the mobile station wireless apparatus,
   wherein when the moving speed is higher than a preselected threshold value, the tap arrangement of said equalizing filter unit is changed so as to restart a starting step of the equalizing filter unit for equalizing a reception signal, depending upon a change state of the tap coefficient used while the reception signal is equalized.

2. A mobile station wireless apparatus equipped with a waveform equalizer capable of removing an adverse influence caused by frequency selective fading, said waveform equalizer comprising:
   an equalizing filter unit including a delay circuit with a tap;
   a discriminator which decodes an output signal of said equalizing filter unit;
   tap arrangement control means which controls a tap arrangement of said equalizing filter unit;
   a tap coefficient monitoring unit which monitors a tap coefficient of said equalizing filter unit; and
   detector means which detects a moving speed of the mobile station wireless apparatus, wherein when the moving speed is higher than a preselected threshold value, the tap arrangement of said equalizing filter unit is changed so as to restart reception signal equalizing steps from a preselected step prior to the present step thereof while said reception signal is equalized, depending upon a change state of the tap coefficient during the equalization of said reception signal.

3. A mobile station wireless apparatus equipped with a waveform equalizer capable of removing an adverse influence caused by frequency selective fading, said waveform equalizer comprising:
   an equalizing filter unit including a delay circuit with a tap;
   a discriminator which decodes an output signal of said equalizing filter unit;
   tap arrangement control means which controls a tap arrangement of said equalizing filter unit;
   a tap coefficient monitoring unit which monitors a tap coefficient of said equalizing filter unit; and
   detector means which detects a moving speed of the mobile station wireless apparatus,
   wherein when the moving speed is higher than a preselected threshold value, an operation is performed in which the tap arrangement of said equalizing filter unit is changed so as to restart reception signal equalizing steps from a preselected step prior to the present step thereof while said reception signal is equalized, depending upon a change state of the tap coefficient during the equalization of said reception signal; and further so as to repeatedly perform said operation, depending upon a change state of the tap coefficient while restarting the equalization of said reception signal.

4. A mobile communication system having a base station and a mobile station, in which said mobile station is equipped with a waveform equalizer capable of removing an adverse influence caused by frequency selective fading, said waveform equalizer comprising:
   an equalizing filter unit including a delay circuit with a tap;
   a discriminator which decodes an output signal of said equalizing filter unit;
   tap arrangement control means which controls a tap arrangement of said equalizing filter unit;
   a tap coefficient monitoring unit which monitors a tap coefficient of said equalizing filter unit; and
   detector means which detects a moving speed of the mobile station wireless apparatus,
   wherein when the moving speed is higher than a preselected threshold value, the tap arrangement of said equalizing filter unit is changed so as to restart a starting step of the equalizing filter unit for equalizing a reception signal, depending upon a change state of the tap coefficient used while the reception signal is equalized.

5. A mobile communication system having a base station and a mobile station, in which said mobile station is equipped with a waveform equalizer capable of removing an adverse influence caused by frequency selective fading, said waveform equalizer comprising:
   an equalizing filter unit including a delay circuit with a tap;
   a discriminator which decodes an output signal of said equalizing filter unit;
   tap arrangement control means which controls a tap arrangement of said equalizing filter unit;
   a tap coefficient monitoring unit which monitors a tap coefficient of said equalizing filter unit; and
   detector means which detects a moving speed of the mobile station wireless apparatus,
   wherein when the moving speed is higher than a preselected threshold value, the tap arrangement of said equalizing filter unit is changed so as to restart reception signal equalizing steps from a preselected step prior to the present step thereof while said reception signal is equalized, depending upon a change state of the tap coefficient during the equalization of said reception signal.

6. A mobile communication system having a base station and a mobile station, in which said mobile station is equipped with a waveform equalizer capable of removing an adverse influence caused by frequency selective fading, said waveform equalizer comprising:
   an equalizing filter unit including a delay circuit with a tap;
   a discriminator which decodes an output signal of said equalizing filter unit;
   tap arrangement control means which controls a tap arrangement of said equalizing filter unit;
   a tap coefficient monitoring unit which monitors a tap coefficient of said equalizing filter unit; and
   detector means which detects a moving speed of the mobile station wireless apparatus,
   wherein when the moving speed is higher than a preselected threshold value, an operation is performed in which the tap arrangement of said equalizing filter unit is changed so as to restart reception signal equalizing steps from a preselected step prior to the present step thereof while said reception signal is equalized, depending upon a change state of the tap coefficient during the equalization of said reception signal; and further so as to repeatedly perform said operation, depending upon a change state of the tap coefficient while restarting the equalization of said reception signal.

* * * * *